Patented Feb. 2, 1943

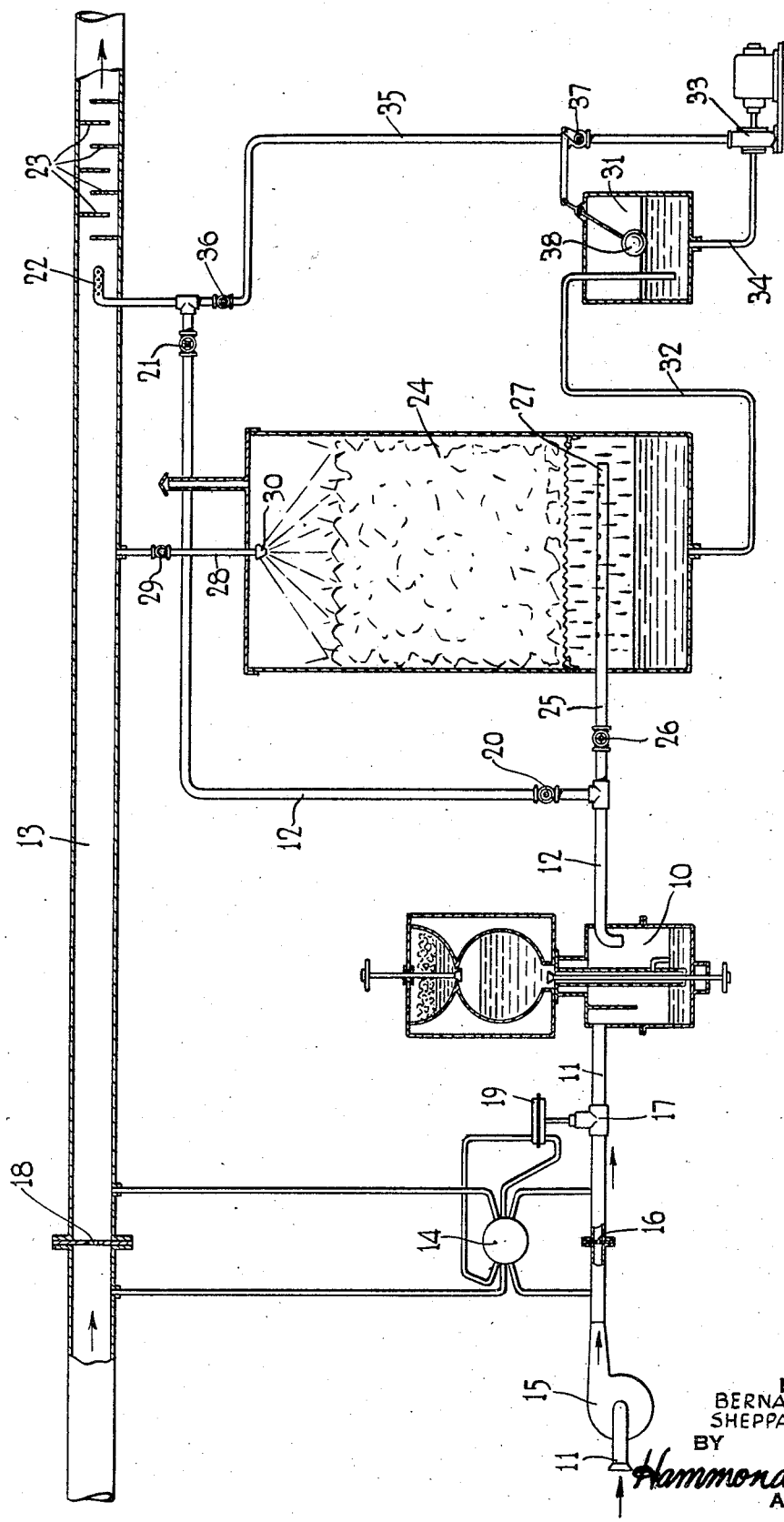

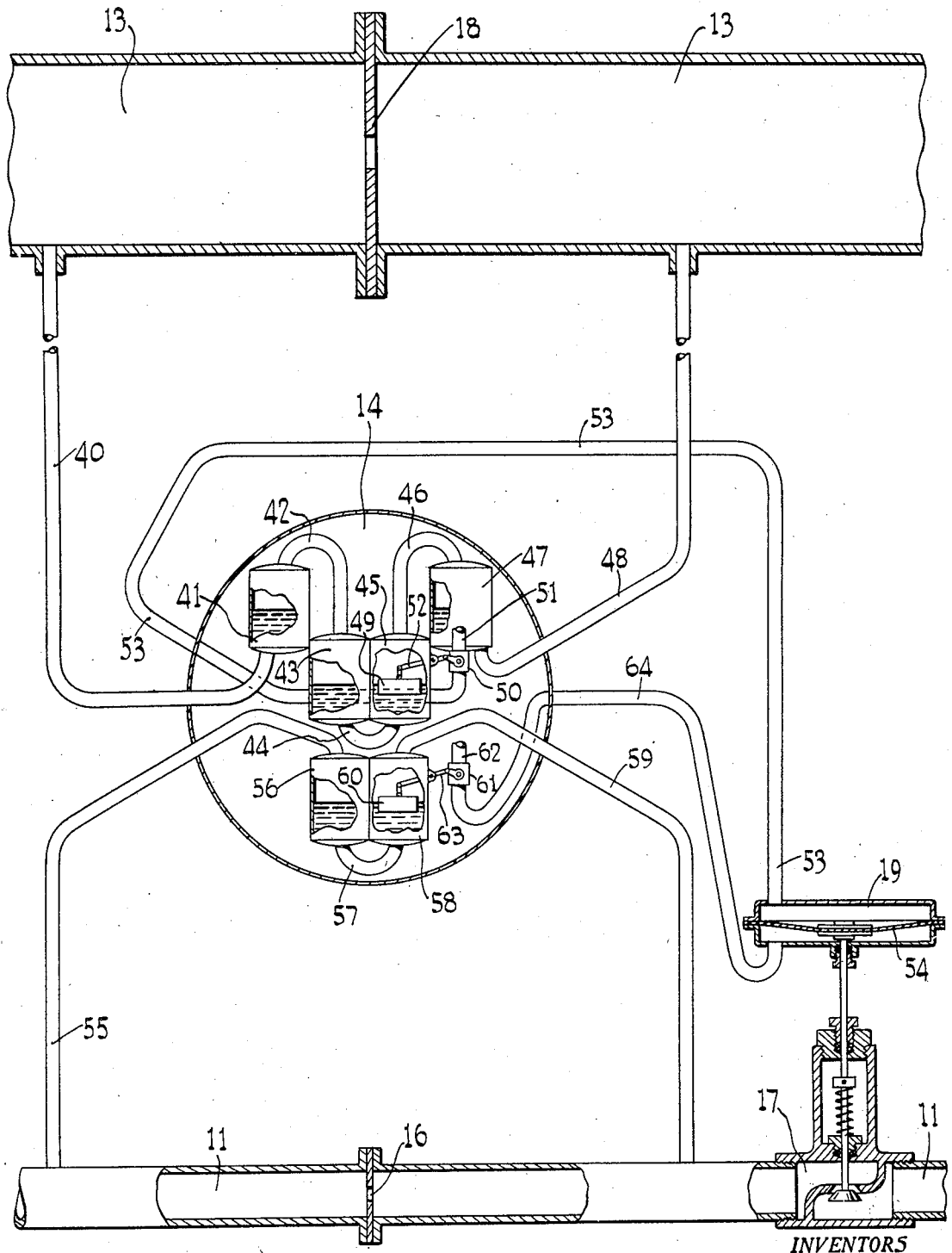

2,310,187

UNITED STATES PATENT OFFICE 2,310,187

PROCESS AND APPARATUS FOR TREATING LIQUIDS WITH SULPHUR COMBUSTION GASES

Bernard A. Axelrad, Freeport, Tex., and Sheppard T. Powell, Baltimore, Md., assignors to Freeport Sulphur Company, New York, N. Y., a corporation of Delaware Application June 5, 1940, Serial No. 338,950

15 Claims. (Cl. 210—16)

This invention relates to a process and apparatus for treating a continuous flow of liquid with sulphur combustion gases.

Sulphur dioxide is extensively used as a reducing agent or as an acidic agent in a wide variety of commercial processes, such as in the treatment of potable water, waste products and other materials. One familiar example of the use of this gas is for removing the chlorine taste from chlorinated drinking water samples. Another example is the reduction of the alkalinity of boiler water with the formation of sodium sulphate whereby caustic embrittlement of boiler steel is prevented.

A third example involves the use of sulphur dioxide to lower the pH value of the water to a point where precipitation of certain scale-forming solids in boiler feed pumps and economizers will be prevented.

Yet another example is the use of sulphur dioxide to decrease the pH value of water to be softened by those base exchange materials which are attacked and disintegrated by water of high pH value. Sulphur dioxide may also be used as an auxiliary reagent with coagulants used in water purification for the removal of turbidity, organic coloring matter or other impurities.

Additional examples of the use of sulphur dioxide are found in the paper, bleaching and in many other arts wherein aqueous solutions are treated with sulphur dioxide to increase the acidity of the solution or to assist in their purification.

In accordance with prior practice, sulphur dioxide has been provided for use in such treatments in the form of a gas, a liquid under pressure as well as in the form of aqueous solutions. When sulphur dioxide is to be used in the liquid state, it is necessary that it be stored under pressure in heavy containers, thereby rendering the cost of transportation and handling unduly high. Moreover, an appreciable amount of sulphur dioxide is unavoidably left in the containers, thereby adding to the cost of the treatment to the consumer. This method of handling sulphur dioxide has other disadvantages apart from its costliness and inefficiency, including the wide variations in the quantity and the pressure of sulphur dioxide delivered when the pressure on the container is released for use of the gas. This latter failing makes uniform treatment of a liquid with sulphur dioxide gas derived from liquid sulphur dioxide quite difficult.

Many attempts have been made to overcome the foregoing deficiencies as by heating the container, drawing the gas off into a low pressure storage container and then with the aid of a suction device, leading the gas into the water to be treated. Under this method, the control of the quantity of reagent added to the water being treated depends upon an accurate control of the volume of gas drawn into each storage container. Such procedures require the use of additional equipment, complicate treatment processes, and create numerous inconveniences in the use of sulphur dioxide.

In accordance with prior practice, there were certain advantages in using sulphur dioxide in aqueous solutions rather than in the liquid or gaseous phase. Yet the preparation of appropriate aqueous solutions requires considerable apparatus and controls. Moreover, the solutions are usually dilute thereby involving bulky and costly packaging and handling.

The solutions of sulphur dioxide are usually made by passing sulphur dioxide gas through an absorption tower which has the absorbing liquid disposed over a large surface of packing material within the tower and collecting the solution as it flows out at the bottom of the tower in the form of a dilute solution of sulphurous acid or alkaline sulphites. This solution is then used as a source of sulphur dioxide for the treatment of various liquids. However, a control of the quantity of sulphur dioxide used in the treatment of such liquids requires a control of the concentration and volume of this auxiliary solution. Numerous solution-feeding devices have been invented which may be used for controlling the volume and concentration of the solution added either in proportion to the flow of a second liquid or at a constantly adjusted rate. These devices are well known in the art of water-treatment but they are costly and complicated. Likewise, attempts to treat a stream of liquid with solutions of sulphur dioxide as it is produced have proven impractical. A constant concentration of sulphur dioxide in a flow of liquid being treated directly with the solution of sulphurous acid or alkaline sulphites requires a regulation both of the rate of sulphur burning and the volume of absorbing liquid. Regulatory devices of a practical nature are not available for exercising such controls. Hence, prior known devices are not adapted for use in processes designed to treat streams of liquids with sulphur dioxide as it is produced unless complicated and expensive auxiliary control devices are introduced.

It is a principal purpose of the instant invention to provide an improved process for treating a stream of liquids or a flow of gases such as air with sulphur dioxide. More particularly, it is an object of the invention to treat uniformly a variable flow of liquids with sulphur dioxide obtained from burning sulphur by a process in which sulphur dioxide is supplied in a quantity which is proportional to the rate of flow of the liquids being treated.

Another object of the invention is to accomplish the uniform treatment of the stream of liquid without the use of devices for directly controlling the concentration of the sulphur dioxide gas used.

A further object of the invention is to obtain the uniform treatment of the stream of liquid with a sulphur dioxide solution without the use of apparatus for controlling the concentration or volume of the solution employed.

Yet another purpose of a particular embodiment of the invention is to treat a stream of liquid with the sulphur dioxide as it is produced without introducing inert combustion gases into the stream being treated.

It is also a purpose of the invention to treat a stream of liquid under pressure with sulphur dioxide as it is produced without subjecting the whole system to pressure.

Other objects achieved by the invention will clearly appear from the description of its illustrative embodiment.

The present invention provides a process by which sulphur dioxide for treating a stream of liquid is produced at a rate proportional to variations in the flow of the liquid being treated. The rate of sulphur dioxide production is preferably regulated by furnishing a combustion supporting gas to an appropriate burner at a rate which is responsive and proportionate to the rate of flow of a liquid being treated. The sulphur dioxide delivered by the burner is then introduced into the stream of liquid at approximately the rate at which it is produced whereby uniform treatment is obtained.

In order to achieve the beneficial results of the instant process in the most efficacious manner, the applicants have provided a coordinated apparatus adapted to treat uniformly a continuous flow of liquid. The new apparatus includes a conduit for a stream of liquid, an appropriate sulphur burner, a device for supplying a combustion gas to the burner at a rate proportional and automatically responsive to the rate of flow of the liquid, and means for conducting the sulphur dioxide to the stream of liquid. The combustion-supporting gas for the burner may be regulated by a metering device, connected to the conduit for the liquid and to the air supplying conduit, which is responsive to variations in the flow or the difference in pressure across an orifice whereby the amount of air supplied to the burner and therefore the amount of sulphur dioxide supplied to the liquid in the conduit is proportional to the amount of liquid being treated. Suitable metering devices of this type are known and can be adjusted to maintain the ratio between the amount of liquid being treated and the sulphur dioxide introduced into the liquid at a predetermined ratio. An appropriate sulphur burner which produces sulphur dioxide at a rate proportionate to the amount of combustion gases furnished is shown in co-pending application Serial No. 277,908, filed June 7, 1939, by associates of the instant applicants.

Under a special embodiment of the invention, a solution of the sulphur dioxide is made before it is introduced into the stream of liquid to be treated. The sulphur dioxide is preferably dissolved in a minor flow of liquid taken from the major stream of liquid being treated. Controls are provided whereby the minor flow of liquid containing the sulphur dioxide is reintroduced into the major stream of liquid at the same rate at which it is removed. When the stream of liquid being treated is under pressure, this embodiment is used advantageously, for then it is only necessary to apply pressure to the liquid containing the sulphur dioxide, while in the first embodiment described herein, involving the direct introduction of sulphur dioxide gas requires that the whole system be under pressure. Furthermore, the formation of the solution of sulfur dioxide before introducing it into the stream of liquid makes possible the elimination of inert gases occurring in the combustion supporting gas.

The advantages and features of the instant invention will be clearly understood from its illustrative embodiment as shown in the accompanying drawings incorporating a modified flow sheet and diagrammatical drawing in elevation.

The drawings illustrate apparatus capable of operation under either of the embodiments discussed above, the change being accomplished merely by the change of valves and the cutting in or out of a motor-operated pump. It should be understood, however, that the invention contemplates apparatus capable of operating under only one, and either one of the embodiments.

Fig. 1 illustrates diagrammatically the apparatus and process of the present invention, most of the elements being shown in vertical section. Fig. 2 is a vertical section through the metering device, control valve and diaphragm mechanism shown in elevation in Fig. 1, which mechanism supplies combustion gas to the sulphur burner at a rate proportional and automatically responsive to the rate of flow of the liquid to be treated.

As shown in Fig. 1, a sulphur burner 10 is provided with a combustion supporting gas inlet conduit 11 and a combustion gas outlet conduit 12 which in turn terminates in a fluid conduit 13. The fluid conduit 13 and the inlet gas conduit 11 are connected to one another through a control or metering device 14.

The gas conduit 11 is provided with a compressor 15, a perforated plate 16 and a valve 17. The control device 14 is connected to the inlet conduit 11 at both sides of the orifice 16 in said conduit and also to the conduit 13 at both sides of a perforated plate 18. The control device 14 is also connected to each side of a diaphragm mechanism 19, which mechanism controls the operation of the valve 17.

The outlet conduit 12 has control valves 20 and 21 and terminates in the fluid conduit 13 in perforated member 22 ahead of a series of baffles 23.

Outlet conduit 12 is connected to an absorption tower 24 through conduit 25 provided with a valve 26 and perforated end 27. The absorption tower 24 is connected to the conduit 13 through a conduit 28 having a valve 29 and terminating within the tower in a spraying device 30. The tower 24 is connected to a tank 31 through a conduit 32. Tank 31 is connected with a motor-operated pump 33 through conduit 34. The pump 33 is connected to the fluid conduit 13 through a conduit 35 provided with valves 36 and 37. Valve 37 is connected to and controlled by a float 38 in container 31.

With reference to Fig. 2, there is illustrated the mechanism of the metering device 14, the control valve 17, and the diaphragm device 19, each in sufficient detail to understand its operation. The pressure of the flow of water or other fluid to be treated passing through the conduit 13 is transmitted through the conduit 40 leading through the wall of the metering device 14, into the bottom of the tank 41 having therein a liquid of suitable density; thence, through the air space of tank 41, and through the conduit 42 to the air space of tank 43 on top of a liquid contained therein; next, through the liquid contained in the bottom of this tank 43 through the conduit 44 connected at its bottom, in the bottom of the tank 45 below the surface of a liquid contained therein; thence, through the air space of this last mentioned tank through a pipe 46 to the top of tank 47 likewise containing a liquid, and finally from the bottom of the tank 47 through the conduit 48 back into the conduit 13 at a point on the opposite side of the perforated plate 18 from the point of connection of the conduit 40. Increases and decreases in pressure in the tank 45 on the surface of the liquid therein cause the float 49 to fall and rise and to actuate the cock 50 in the conduit 51 (open and close, respectively) by means of the lever 52, this conduit 51 being connected to a source of compressed air (not shown). The air passing through the valve 50 flows through the conduit 53 to the top side of the diaphragm device 19 and thence out through an air vent control valve (not shown). Increases and decreases in air pressure cause the diaphragm 54 in the element 19 to lower and rise and the valve stem to move in a direction which enlarges and reduces, respectively, the passage in the conduit 11.

The valve 17 is also actuated and controlled in part by the rate of flow or pressure of the combustion supporting gas in the conduit 11. A conduit 55 connected to the conduit 11 transmits the pressure of the combustion supporting gas to the top of the tank 56 having a suitable liquid therein, thence through a conduit 57 connected at its bottom to the bottom of a similar tank 58 also containing a liquid, and finally through the air space of this tank 58 into the conduit 59 connected at its top, back into the conduit 11 on the opposite side of the perforated plate 16 from the conduit 55. Changes in pressure in this system cause changes in the levels of the liquids in the tanks 56 and 58. This change of level in tank 58 causes the float 60 to rise or fall, which movement opens and closes, respectively, the valve 61 in the conduit 62 through the action of the lever 63. The conduit 62 is connected to a source of compressed air (not shown). An increase in the rate of flow or pressure in the conduit 11 causes the valve 61 to open and an increased air pressure to be exerted through the conduit 64 into the device 19 at a point below the diaphragm 54. This side of the diaphragm is likewise provided with an air vent control valve (not shown). Through the foregoing mechanism, increases and decreases in the rate of flow of the combustion gas cause the diaphragm to rise and fall and to decrease and increase the size of the opening in the valve 17 in the conduit 11.

In operation of the system for the introduction of the gas directly into the liquid to be treated, the valves 20 and 21 are opened and the valves 26, 29 and 36 are closed. The metering device 14 is responsive to variations in pressures at the perforated plate 18 and is operatively connected to diaphragm 19, thereby regulating the amount of air passing through the valve 17. Sulphur burner 10 thus provides sulphur dioxide at a rate which is responsive to the amount of combustion supporting gas permitted to pass through the inlet conduit 11 by the control valve 17. As the sulphur dioxide is produced it passes through the outlet 12 and into the stream of liquid through the perforation 22 substantially at the rate at which it is being produced. Thus the amount of air supplied the burner and the amount of sulphur dioxide delivered to the stream of liquid is directly proportional to the volume of liquid being treated.

In the alternative operation of the apparatus the metering device 14 and other controls operate in the same manner, but valves 20 and 21 are closed and the valves 26, 29 and 36 are opened. With these changes the sulphur dioxide passes through the outlet conduit 12, the conduit 25, and out of the perforated end 27 into the base of the absorption tower 24. A liquid admitted from the main stream by means of the valved conduit 28 flows out of the spray device 30 into the top of this tower, thereby being distributed over the packing material in the tower whereby the sulphur dioxide being emitted from the perforations 27 is absorbed. The valve 29 in conduit 28 is so adjusted that liquid is supplied in a quantity more than sufficient to absorb completely the sulphur dioxide while any inert gas is allowed to pass out of the gas outlet provided. As the liquid accumulates in the base of the tower, it is overflowed into the tank 31 through the conduit 32. Float 38 is responsive to the level of the liquid in the tank 31 and controls valve 37 and through it the pump 33 whereby the liquid in the tank is maintained at a constant level. Through this system of control, the liquid is always returned to the conduit 13 at the same rate at which it is withdrawn therefrom. Hence, the amount of water metered at the perforated plate 18 is the amount of water actually being treated with sulphur dioxide. Moreover, in view of the fact that all of the sulphur dioxide being delivered from the burner 10 is taken up in the absorption tower 24 by the absorption liquid, which is continuously reintroduced into the conduit 13 at the same rate at which it is being taken therefrom, it is clear that the sulphur dioxide is continuously introduced into the stream of liquid at the rate at which it is produced. Thus, the control device 14 accurately measures the amount of liquid being treated and through its control of the air supplied the burner actually controls the amount of sulphur dioxide being introduced into the liquid. Therefore, the arrangement just described makes it possible to maintain an addition of sulphur dioxide to the stream of liquid at any predetermined constant proportion. In contrast thereto, if the absorption tower were supplied with liquid from an external source, it would be necessary to use additional controls to regulate the volume of such liquid directly in proportion to the variations in flow of liquid in the conduit 13 if the proportion of sulphur dioxide added to the liquid being treated is to be maintained constant.

There are several distinct advantages in absorbing the sulphur dioxide in a liquid medium in the manner described. In the first place, unnecessary and at times undesirable inert gases are eliminated before the sulphur dioxide is introduced in the main stream liquid. In the second place, a major stream of liquid under pressure can be treated with sulphur dioxide by forcing the minor flow of liquid from the auxiliary tank 31 into the stream by the force of the pump 33 in the conduit 34 connecting this tank to the main body of liquid without maintaining pressure in the remainder of the system.

The foregoing description is illustrative, but it is not intended to define the limits of the invention. Various changes in the construction of the apparatus and mode of operation of the invention will occur to those skilled in the art without departing from the spirit of the invention as defined in the appended claims.

We claim:

1. A method of maintaining constant the proportion of a sulphur combustion gas added to a stream of liquid to be treated therewith which comprises supplying a combustion-supporting gas to a combustion chamber containing sulphur, controlling the rate of combustion-supporting gas supplied said combustion chamber and the amount of sulphur combustion gas produced by means automatically actuated by the stream of liquid in accordance with the rate of flow thereof and introducing the sulphur combustion gas as produced into the stream of liquid.

2. The method of introducing sulphur dioxide into a stream of aqueous liquid at a rate proportional to the rate of flow of the liquid which comprises, supplying air to a sulphur burner to produce sulphur dioxide by combustion of sulphur, controlling the rate of supply of air and the amount of sulphur combustion gas produced by means automatically actuated by the stream of liquid in accordance with the rate of flow thereof and introducing the sulphur dioxide as produced into the stream of liquid.

3. The method of introducing sulphur dioxide into a stream of water at a rate proportional to the rate of flow of the water which comprises, supplying air to a sulphur burner to produce sulphur dioxide by combustion of sulphur, controlling the rate of supply of air and the amount of sulphur combustion gas produced by means automatically actuated by the stream of liquid in accordance with the rate of flow thereof dissolving the sulphur dioxide in a body of water and introducing this body of water into the stream of water at a rate which maintains the proportion of sulphur dioxide in the stream of liquid substantially constant.

4. The process of uniformly treating a variable flow of liquid with sulphur dioxide which comprises producing sulphur dioxide by combustion at a rate responsive and proportionate to the amount of air supplied to the combustion chamber, supplying air to said chamber at a rate controlled automatically by means actuated by the flow of liquid in accordance with the rate of flow thereof and introducing the sulphur dioxide produced into the flowing liquid.

5. The process for treating a variable major flow of liquid with sulphur dioxide to maintain the proportion of the sulphur dioxide in said liquid at a predetermined constant which comprises, supplying air to a sulphur burner at a rate controlled automatically by means actuated by the flow of liquid in accordance with the rate of flow thereof, introducing the sulphur dioxide substantially at the rate at which it is produced into a minor flow of liquid, and conveying said minor flow of liquid containing sulphur dioxide into said major flow of liquid.

6. In the treatment of a stream of liquid with sulphur dioxide obtained from a sulphur burner which delivers sulphur dioxide at a rate which is responsive to the amount of air supplied said burner, the process which comprises, introducing air into said burner at a rate controlled automatically by means actuated by the stream of liquid in accordance with the rate of flow thereof and continuously introducing the sulphur dioxide produced into said stream of liquid, whereby the ratio between the amount of liquid being treated and the amount of sulphur dioxide being introduced into said liquid is maintained at a constant.

7. The process of treating a variable flow of fluid with sulphur dioxide derived from a sulphur burner which delivers sulphur dioxide at a rate which is responsive to the amount of air supplied said burner whereby the ratio between the amount of fluid being treated and the proportion of sulphur dioxide introduced into said fluid is maintained at a predetermined constant which comprises, introducing air into said burner at a rate controlled automatically by means actuated by the flow of liquid in accordance with the rate of flow thereof and continuously introducing the sulphur dioxide produced directly into said flow of fluid.

8. In the treatment of a stream of liquid at an accurately controlled rate with sulphur dioxide derived from a sulphur burner which delivers sulphur dioxide at a rate which is responsive to the amount of air supplied said burner, the method which comprises, introducing air into said burner at a rate controlled automatically by means actuated by the stream of liquid in accordance with the rate of flow thereof and continuously introducing the sulphur dioxide produced into a minor flow of liquid which liquid containing the sulphur dioxide is introduced into the stream of liquid being treated, at a rate which maintains constant the proportion of the sulphur dioxide introduced into the liquid being treated independently of the rate of said minor flow of liquid.

9. An apparatus for uniformly treating a flow of fluid with sulphur dioxide which comprises in combination, a sulphur dioxide producer adapted to produce sulphur dioxide at a rate continuously proportional to the amount of air introduced therein, a conduit means for said fluid, means for controlling the flow of combustion supporting gases to the sulphur dioxide producer automatically responsive to the rate of flow of fluid in said conduit means, means actuated by the fluid in accordance with the rate of flow thereof in said conduit means for automatically governing said air control means and means for introducing the sulphur dioxide into the flow of fluid.

10. An apparatus for treating a continuous flow of liquid comprising a conduit means for conducting a liquid, a sulphur burner adapted to produce sulphur dioxide at a rate continuously proportional to the amount of air introduced therein, means for supplying air to said burner, means for conducting sulphur dioxide produced by said burner into said conduit, means responsive to variations in the rate of flow of the liquid for controlling the amount of air supplied to said burner and means actuated by the liquid in accordance with the rate of flow thereof in said conduit means for automatically governing said air control means.

11. An apparatus for uniformly treating a stream of liquid with sulphur dioxide which comprises in combination, a conduit means for conducting the liquid to be treated, a sulphur burner adapted to produce sulphur dioxide at a rate continuously proportional to the amount of air introduced into the burner, an air supplying means connected to said burner, means actuated by the liquid in said conduit means and connecting said conduit means and said air supply means adapted to regulate automatically the flow of air into said burner at a rate proportionl to the rate of flow of the stream of liquid, and means for introducing the sulphur dioxide produced in said burner into the liquid flowing in said conduit means.

12. An apparatus for treating a continuous flow of liquid with sulphur dioxide comprising in combination, a conduit for conducting a liquid, a sulphur burner adapted to produce sulphur dioxide at a rate continuously proportional to the amount of air introduced therein, means for supplying air to said burner, means for conducting sulphur dioxide produced by said burner into an absorbing liquid, means for conducting said absorbing liquid into said conduit, means automatically responsive to variations in the rate of flow of liquid through said conduit for controlling the amount of air supplied to said burner by said air supplying means and means actuated by the liquid in accordance with the rate of flow thereof in said conduit for automatically governing said air regulating means.

13. An apparatus for supplying sulphur dioxide to a stream of liquid at an automatically and accurately controlled rate comprising in combination, a sulphur burner which delivers sulphur dioxide at a continuous rate automatically responsive to the amount of air supplied said burner, means for supplying air to said burner, means for controlling the amount of air supplied said burner which is automatically responsive to and actuated by the liquid in accordance with the rate of flow of said stream of liquid, and means for introducing the sulphur dioxide from the sulphur burner directly into the stream of liquid being treated.

14. An apparatus for automatically maintaining a constant proportion of sulphur dioxide added to a stream of liquid, comprising in combination, a conduit for conducting the liquid to be treated, a sulphur burner which delivers sulphur dioxide at a continuous rate automatically responsive to the amount of air supplied said burner, means for supplying air to said burner, means for controlling the amount of air supplied said burner which is automatically responsive to the rate of flow of said liquid, means for introducing the sulphur dioxide from the sulphur burner into a minor flow of liquid obtained from said stream of liquid and means for automatically introducing said minor flow of liquid containing the sulphur dioxide into said stream of liquid.

15. An apparatus for treating a continuous flow of liquid with sulphur dioxide comprising in combination, a conduit for conducting a liquid, a sulphur burner adapted to produce sulphur dioxide at a rate continuously proportional to the amount of air introduced therein, means for supplying air to said burner, means for conducting sulphur dioxide produced by said burner, into an absorbing liquid obtained from said continuous flow of liquid, means automatically responsive to variations in the rate of flow of liquid through said conduit for controlling the amount of air supplied to said burner by said air supplying means, and means for conducting said absorbing liquid into said conduit at substantially the same rate it is removed therefrom.

BERNARD A. AXELRAD.
SHEPPARD T. POWELL.